United States Patent [19]

Sweazey

[11] Patent Number: 5,333,267
[45] Date of Patent: * Jul. 26, 1994

[54] RING INTERCONNECT SYSTEM ARCHITECTURE

[75] Inventor: Paul Sweazey, San Jose, Calif.

[73] Assignee: Apple Computer, Inc., Cupertino, Calif.

[*] Notice: The portion of the term of this patent subsequent to Nov. 17, 2009 has been disclaimed.

[21] Appl. No.: 530,096

[22] Filed: May 29, 1990

[51] Int. Cl.$^5$ ............................................. G06F 13/38
[52] U.S. Cl. ................................... 395/200; 364/229.3
[58] Field of Search ............... 364/229.3, 241.8, 246.1, 364/940.63; 395/250, 325; 370/85.15

[56] References Cited

U.S. PATENT DOCUMENTS

| | | | |
|---|---|---|---|
| 4,800,490 | 1/1989 | Tanaka et al. | 395/250 |
| 4,814,978 | 3/1989 | Dennis | 364/200 |
| 4,837,676 | 6/1989 | Rosman | 364/200 |
| 4,930,121 | 5/1990 | Shiobara | 370/85.4 |
| 4,947,317 | 8/1990 | DiGiulio et al. | 364/200 |
| 4,967,409 | 10/1990 | Narumiya et al. | 370/85.6 |
| 4,993,025 | 2/1991 | Vesel et al. | 370/85.12 |
| 5,165,019 | 11/1992 | Sweazey | 364/200 |
| 5,165,024 | 11/1992 | Sweazey | 395/325 |

Primary Examiner—Dale M. Shaw
Assistant Examiner—D. Dinh
Attorney, Agent, or Firm—Blakely, Sokoloff, Taylor & Zafman

[57] ABSTRACT

An improved computer system ring interconnection comprising a plurality of nodes each such node being associated with at least one of a plurality of computer system components; transmission apparatus connecting each of said nodes to a node which is a source of information and to a node which is a recipient of information; each of such nodes comprising apparatus for distributing information received from a node which is a source of information, apparatus for receiving information from and transferring information to the associated one of the system components, apparatus for relaying between the transmission apparatus information to be transferred through the node directed to other such nodes, apparatus for placing a voucher signal on the transmission apparatus in response to the receipt of information from the associated one of such components to indicate that the component has information to be transmitted to another system component, apparatus responsive to the receipt of a voucher signal for determining whether the apparatus for receiving information from and transferring information to the associated one of the system components is able to receive information, apparatus responsive to the determination that the associated component is able to receive information for placing a ticket signal to so indicate on the transmission apparatus, apparatus for transferring information received from the associated system component to the transmission apparatus in response to the receipt of a ticket signal, and apparatus for selecting information to be transferred based on the urgency of the information.

9 Claims, 4 Drawing Sheets

RING INTERCONNECT SYSTEM ARCHITECTURE

BACKGROUND OF THE INVENTION

1. Field of the Invention

This invention relates to interconnection circuitry and, more particularly, to apparatus for handling data within a computer system in a manner that a plurality of data sources can transfer information to a plurality of destinations concurrently.

2. History of the Prior Art

The typical computer system utilizes a busing arrangement as its primary interconnection to transfer information from one component of the system to another. In such a system, a component such as a central processor directs information to another component such as main memory by placing the address to which the information is directed on the system address bus and the information on the system data bus. The destination for the information recognizes an address on the address bus within its range of addresses and accepts the information available on the data bus. Each of these buses is made up of a number of conductors (for example, thirty-two) which physically connect to each of the system components. During the time that any particular source of information is utilizing the buses, they are unavailable for use by any other source since all of the conductors of each bus available to carry either address or data information are occupied. Consequently, information may be sent by only one source at a time (although more than one destination may receive information if more than one destination can respond to the same address) since there is no room for information from more than one source at a time on the data or address buses.

In the past, a bus arrangement has sufficed for transferring information in the typical personal computer or work station. However, the requirements for pathways to handle more and more information faster have increased to the point that various functions cannot be performed by the typical busing arrangement. Functions such as the presentation of animated graphics and television require the transfer of so much information that they tend to require that the entire system be devoted to their use. When it is desired to incorporate a number of these functions into the same computer system and to run more than one of them at a time, a busing arrangement is incapable of handling the load.

In order to overcome the limitations of a bus system, it seems apparent that more than one interconnection between system components is necessary. The ultimate arrangement would be one in which each component were connected to each other component. This, however, appears to require a great deal of control circuitry and a very large number of conductors which would probably be used substantially less than full time. As a compromise between the single system bus and the direct connection of all components, various ring arrangements have been suggested. In such an arrangement, each component is directly connected by one-way connection paths to receive information from one single other system component and to send information to another single system component. Thus, all components which would normally be connected to a bus are connected to only two other components in a unidirectional ring. Each component then forwards information around the ring until the information arrives at its destination. Separating the interconnection into individual paths between components isolates the components from all but two other components but increases the amount of traffic which can be handled by the ring interconnect over the amount which may be placed on a system bus because a number of sources of information can communicate with a number of destinations at the same time. This occurs because the isolation allows one system component to send information to a second component while a third component sends information to a fourth component.

In ring-type systems suggested to date, one system component places a packet of information on the ring addressed to another component. The packet is forwarded to the addressed component; and, if that component cannot handle the incoming information, it places a retry command on the ring. The retry command causes the operation to be terminated, the transmitted information to be dumped, and the packet to be re-sent after some delay. The retry operation inherently slows the system when the amount of traffic on the system approaches saturation. In fact, as the amount of information placed on the ring increases in retry systems, the ability to handle that information decreases because the system thrashes as the number of retries increases. In fact, such retry systems typically are able to handle no more than one-third to one-half of theoretically attainable loads.

In order to overcome the problems of proposed ring systems and provide a system capable of transferring much more data than conventional computer arrangements, a new interconnect has been devised which is the subject of U.S. Pat. No. 5,165,019, entitled RING INTERCONNECT SYSTEM ARCHITECTURE, P. Sweazey, filed May 29, 1990, and assigned to the assignee of this invention. This interconnect is made up of a plurality of nodes each such node being associated with at least one of a plurality of computer system components. The nodes are, as in prior art systems, connected in a unidirectional ring in which transmission paths connect each of the nodes to one node which is a source of information and to another node which is a recipient of information.

Each of such nodes includes apparatus for receiving information from and transferring information to the associated one of the system components. When the associated system component desires to transfer information to another system component, it causes the associated node to generate and place a voucher signal on the transmission path to indicate that the node has information to be transmitted to another system component. Each node includes storage space for information and apparatus which responds to the receipt of a voucher signal directed to it as a target node for determining whether the node is able to store information in its storage space. Each node also includes apparatus which responds to a determination that storage space is available by placing a ticket signal to so indicate on the transmission path directed to the node which is to be the source of the information. When a source node receives such a ticket signal, it causes the information packet to be launched on the transmission path. In this manner, no information is propagated on the transmission path until space is available for it at the target node and delays due to information rejection at the target node are eliminated.

Each node also includes circuitry to relay voucher and ticket signals and information which are directed to another node so that information is passed along the transmission path. Moreover, each node includes apparatus for assuring that both voucher and ticket signals are transferred by the node in preference to any information. By this means the transferred information on the transmission path does not get in the way of and delay the signals which control the transmission of that information.

Although such an interconnect system provides substantial benefits over the typical bus interconnection of the prior art, it would be advantageous were the system able to select among the different information to be transferred by the various nodes and transmit first that information which is most urgent. In this manner, the system would be able to resolve conflicts between different types of information and handle information such as sound and video prior to information which does not have the same real time requirements.

SUMMARY OF THE INVENTION

It is, therefore, an object of the present invention to increase the load handling abilities of a computer system.

It is another, more specific object, of the present invention to provide an improved secondary interconnection arrangement for a computer system.

It is an additional object of the present invention to provide a secondary interconnection arrangement for a computer system capable of handling concurrently information from a plurality of sources directed to a plurality of destinations and to select among information available for handling in a manner that the most urgent information is handled first.

These and other objects of the present invention are realized in an improved computer system ring interconnection comprising a plurality of nodes each such node being associated with at least one of a plurality of computer system components; transmission means connecting each of said nodes to a node which is a source of information and to a node which is a recipient of information; each of such nodes comprising means for distributing information received from a node which is a source of information, means for receiving information from and transferring information to the associated one of the system components, means for relaying between the transmission means information to be transferred through the node directed to other such nodes, means for placing a voucher signal on the transmission means in response to the receipt of information from the associated one of such components to indicate that the component has information to be transmitted to another system component, means responsive to the receipt of a voucher signal for determining whether the means for receiving information from and transferring information to the associated one of the system components is able to receive information, means responsive to the determination that the associated component is able to receive information for placing a ticket signal to so indicate on the transmission means, means for transferring information received from the associated system component to the transmission means in response to the receipt of a ticket signal, and means for selecting information to be transferred based on the urgency of the information.

These and other objects and features of the invention will be better understood by reference to the detailed description which follows taken together with the drawings in which like elements are referred to by like designations throughout the several views.

NOTATION AND NOMENCLATURE

Figure 1:
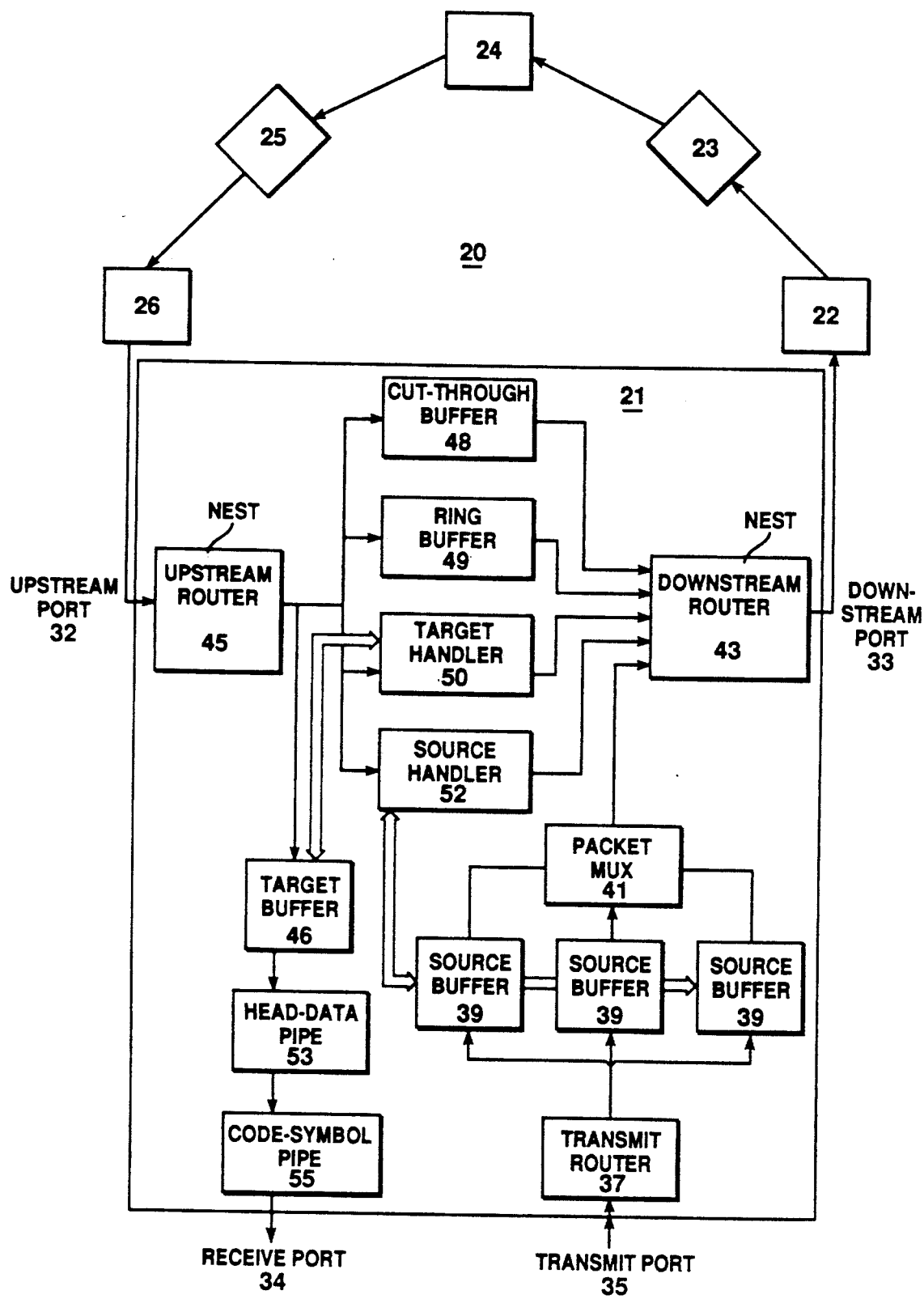
FIG. 1 is a block diagram of an interconnect for a computer system constructed in accordance with the prior art.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

As explained above, various ring interconnection arrangements have been suggested in which each component is directly connected by one-way connection paths to receive information from one single other system component and to send information to another single system component. Thus, all components which would normally be connected to a bus are connected by transmission paths to only two other components in a unidirectional ring. Each component then forwards information around the ring until the information arrives at its destination. Separating the interconnection into individual paths between components isolates the components from all but two other components but increases the amount of traffic which can be handled by the ring interconnect over the amount which may be placed on a system bus because a number of components which are sources of information can communicate at the same time with a number of other components which are destinations. However, the ring interconnect systems suggested until recently have been retry systems which inherently slow as the amount of traffic on the system approaches saturation.

To overcome the problems of the retry ring systems, the system of the above-mentioned patent application has been devised. This ring interconnect system is based on a different operating principle which allows the amount of information transferred to increase as the amount of traffic within the system increases even as saturation approaches. The system breaks information to be sent into packets each of no more than a preselected size. A reservation voucher is generated for each packet of information which is to be sent. The voucher is placed on the ring interconnect by the source component addressed to the destination component while the packet of information remains at the source component. The voucher is forwarded by the various components which are unaddressed nodes on the ring interconnect until it reaches the addressed component.

If the destination component can accept the packet of data, space for the packet is reserved at the destination component; and a ticket signal is placed on the ring interconnect addressed to the source component. If the destination component cannot accept the packet of information, the voucher is stored in a queue at the destination until the destination component is able to handle the packet. When the destination component is able to handle the packet, a ticket signal is placed on the ring interconnect addressed to the source component. When the ticket signal is received by the source component, the packet is released onto the ring interconnect. The packet is forwarded by the various components which are unaddressed nodes on the ring interconnect until it reaches the addressed component. When the packet of information arrives at the destination component, space is available and the information is stored in that space for utilization.

Using this system, information is never placed on the ring interconnect until space is available at the destination. Consequently, a retry is not necessary and information need not fill the interconnect to interfere with other information only to be dumped when a destination component is busy. Retry delays are not a factor in the system. This substantially reduces the loss of system bandwidth caused by the retry method and allows the system to function much more efficiently than retry systems when approaching saturation.

In order to make the operation more efficient, apparatus is provided so that the flow of voucher and ticket signals is not impeded by the flow of the information packets. This is accomplished by apparatus in each node which assures that voucher and ticket symbols are transmitted in preference to information packets. In this manner, the large delays which might otherwise be experienced from the time a voucher is transmitted until the receipt of a ticket while either the voucher or the ticket wait for information packets to clear the transmission lines is eliminated.

The present invention is an improvement of the system of the co-pending patent application. The present invention renders the ring interconnect system even more efficient by dividing information into different urgencies and assuring that the most urgent information is sent by each node before less urgent information. Such an arrangement allows information such as video and sound information which requires immediate handling to be transferred at a higher urgency level than information which may be delayed without affecting its usefulness.

The system of the present invention is, in general, similar to the system disclosed in the co-pending patent application except that various elements thereof have been modified in order to provide the improvements of this invention. In order to understand the operation of the present invention, it is necessary to understand the operation of the invention disclosed in the above-mentioned patent application. FIG. 1 is a block diagram of a computer system constructed in accordance with the invention disclosed in the above-mentioned patent application. In FIG. 1, a ring interconnect arrangement 20 is illustrated. The arrangement 20 shown in the figure has six individual nodes 21-26 each of which may be associated with or a part of one of the components (e.g., central processing unit, random access memory) of a computer system. Each of the components includes node circuitry which includes all of the circuitry for accomplishing the generation of vouchers and tickets and for placing packets of data on the ring interconnect.

Since all of the nodes 21-26 are similar, only the node 21 is illustrated in detail. The node 21 includes an upstream port 32 connected to receive information and a downstream port 33 connected to transmit information in the ring interconnect arrangement 20. The node 21 also includes a receive port 34 through which information is transferred to the associated component of the computer system and a transmit port 35 through which information is transferred from the associated component of the computer system.

In this description, the following definitions are used. A symbol is any quantity of data that can be transferred on a parallel data path during one phase of a clock cycle. A stream is a logically-contiguous sequence of data symbols of arbitrary length. A packet is a portion of a stream having a fixed limit consisting of one head symbol, data symbols, and one tail symbol. The first symbol in a packet of information is a head symbol and the last is a tail symbol. Each symbol used with the ring interconnect 20 includes bits which identify its source node, its target node, the stream with which it is associated, and an indication of the type of signal (voucher, ticket, head, data, or tail). Thus, a voucher symbol indicates its source, its target, its stream, and that it is a voucher. Head, data, and tail symbols are sometimes referred to as packet symbols. Vouchers and tickets are also called access symbols.

Typically, the ring interconnect arrangement 20 illustrated in FIG. 1 is a secondary interconnection and the individual components of the computer system are components which are joined in a primary busing arrangement such as the NuBus manufactured and used by Apple Computer, Inc., in its line of Apple Macintosh II personal computers. In such an arrangement, each of the components is also connected to the ring interconnect arrangement 20 through an individual node which joins to the ring interconnect. Typically, a stream of information enters the node 21 through the transmit port 35 from the component associated with the node and is transferred to the ring interconnect 20 through the downstream port 33. Information directed on the ring interconnect 20 to a node arrives at the upstream port 32 of a target node and is transferred to the component via the receive port 34.

The transmit port 35 of the node 21 is connected to a transmit router 37. The transmit router 37 is responsible for controlling the flow of streams through the transmit port 35 and for sending those streams of information to one of a plurality of source buffers 39. The transmit router 37 receives the symbol stream from the transmit port 35, determines which of the source buffers 39 is entitled to receive the stream, and forwards the stream to the selected source buffer 39. The transmit router 37 sorts the incoming symbols by stream number and collects those symbols together so that all symbols pertaining to one stream are placed in one source buffer 39.

Each source buffer 39 functions to hold one of a number of multiple source streams and to hold that stream until it can be sent through the downstream port 33. The function of a source buffer 39 is to place symbol streams in packets before transmission around the ring interconnect 20 to maximize the efficiency of the transfer by maximizing the ratio of data symbols to access symbols while limiting packet size to limit transmission delay. As soon as a source buffer 39 has a head symbol and one data symbol, it sends signals indicating the target node and the stream to a source handler 52.

The source handler 52 manages permission for a new packet to be launched onto the ring interconnect 20. The source handler 52 responds to the target node identifier and the stream number by forming a voucher using this information and sending the voucher symbol to the downstream router 43. The voucher is placed on the ring interconnect 20 to cause storage space to be reserved in the target buffer 46 of a target node. The source handler 52 then awaits the return of a ticket symbol for the stream. During this period, it may send additional vouchers for other source buffers 39 so that multiple vouchers may be outstanding form a single source node. It should be noted that in this arrangement of the co-pending patent application, the information signals from a source node have no urgency levels.

A packet selector multiplexor 41 determines which source buffer 39 should be emptied and forwards the chosen stream of information to a downstream router 43. The packet multiplexor 41 selects among the source buffers 39 that have permission to transmit a packet and selects one. Once selected, the packet multiplexor 41 transmits the packet of information until terminated by the source buffer 39. Each packet regardless of its source is transmitted to the downstream router 43. The downstream router 43 chooses between many possible sources of information by selecting them according to a defined priority which will be explained later. The downstream router 43 controls the transfer of information onto the ring interconnect 20 through the downstream port 33.

An upstream router 45 is arranged to receive and interpret the symbol stream arriving at the upstream port 32. The upstream router 45 uses the coding describing the type of symbol (voucher, ticket, head, data, tail), the target for the symbol, and the stream number to distinguish between the incoming symbols and to direct the incoming symbols to their proper places. The cut-through buffer 48, the target handler 50, and the source handler 52 receive access symbols (vouchers and tickets) while the ring buffer 49 and the target buffer 46 receive the packet symbols (heads, data, and tails). The cut-through buffer 48 and the ring buffer 49 handle symbols which are forwarded through the node while the target handler 50, the source handler 52, and the target buffer 46 handle symbols intended for the node 21.

The upstream router 45 decodes the information and determines if it is addressed to that node 21. The target buffer 46 is connected to receive packets of information from the upstream router 45 which are directed to that particular node 21. If the symbol is a head symbol addressed to this node, it is directed to the target buffer 46. If the symbol is associated with a matching head symbol (i.e., the following packet of information and tail symbol), it is directed to the target buffer 46. The cut-through buffer 48 is a temporary repository of access symbols not addressed to the particular node 21. The ring buffer 49 is a large capacity first-in first-out circuit that passes packets of information from the upstream port 32 that are destined for another downstream node. The target handler 50 receives the voucher access symbols directed to that node that request space in the target buffer 46, monitors the state of the target buffer 46 and the arrival of vouchers, reserves space in the target buffer 46 for the information, and generates ticket symbols to acknowledge that space has been reserved in the target buffer 46 for a forthcoming stream of data. The target handler 50 issues the tickets in a manner which to guarantee that the target buffer 46 will not overflow. If the number of vouchers requesting space in target buffer 46 exceeds the space available, the additional vouchers are stored in a target voucher queue in the target handler 50 organized as a first-in first-out circuit. Since this voucher queue is a first-in first-out circuit, no priority for space in the target buffer 46 is given to information based on the urgency of that information.

The source handler 52 receives the ticket symbols which indicate that a target node is ready to receive information from the node 21. As pointed out above, it is the source handler 52 which generates the voucher access symbols sent by the downstream router 43 to reserve space at a target node for a stream of information held in a source buffer 39. Thus, when the source handler 52 receives a ticket symbol indicating that space has been reserved in a target node, the source handler 52 releases the appropriate packet of data from the source buffer 39 by sending a launch signal to the appropriate source buffer 39 giving it permission to send the packet of data collected. The source buffer 39 sends a start signal to the packet multiplexor 41 which eventually responds by enabling the output of the source buffer 39.

The downstream router 43 selects between the numerous sources of symbols and routes their symbol streams to the downstream port 33. The highest priority symbols are those from the cut-through buffer 48 and nothing can inhibit the transfer of these symbols from propagation through the downstream port 33. The cut-through buffer 48 stores forwarded access symbols (vouchers and tickets), accounting for phase differences between the upstream router 45 and the downstream router 43. Access symbols not addressed to this node 21 pass through the cut-through buffer 48 thereby assuring maximum propagation speed for such symbols around the ring interconnect. The next highest priority source of symbols is the target handler 50 whose primary function is to return the ticket access symbols generated by this node 21 in response to received voucher access symbols. The next highest priority source of symbols is the source handler 52 which sends the voucher access symbols generated at this node 21 to the downstream router 43. All of these access symbols propagate through the node 21 and around the ring interconnect 20 with greater priority than any of the packet symbols.

If there are no access symbols awaiting transmission, then packet symbols may be forwarded from the ring buffer 49 or from the packet multiplexor 41. The ring buffer 49 is the temporary repository of packet symbols that are to be forwarded to other nodes. It may be organized as a first-in first-out circuit whose capacity is sufficient to absorb whatever upstream traffic may arrive while the downstream router 43 is selecting and transmitting symbols from other sources. Since it is organized in this manner, no priority is given to packets of information based on urgency; whatever the urgency level of the information, it waits in line with the other information in the ring buffer 49.

If the amount of traffic becomes too large for the ring buffer 49 to handle, the buffer 49 sends an urgent signal to the downstream router 43 to assure that its packets of data are handled first and do not overflow. If neither the ring buffer 49 nor the packet multiplexor 41 is in the process of transmitting a packet, then the head symbol of the first packet to request transmission is selected for transmission to the downstream port 33. If a packet is being sent by one or the other of the packet sources, the other cannot transmit. If a head symbol appears at the ring buffer 49 or the packet multiplexor 41 during transmission of a packet, then it is next selected (after any access symbols) upon termination of the current packet.

Thus, the arrangement of FIG. 1 provides that a stream of information from transmit port 35 is directed to a source buffer 39. The source buffer 39 forms a packet and signals the formation to the source handler 52 which generates a voucher symbol carrying the target and source identifiers. This voucher symbol is sent to the downstream router 43. The downstream router 43 selects among the available symbols and transmits first the access symbols directed to other target nodes residing in the cut-through buffer 48 and then the other access symbols. Ultimately, the voucher at the source handler 52 is placed on the ring interconnect 20 before any packet symbols and traverses to the target node where it is routed by the upstream router to the target handler 50 of a target node. The target handler 50 recognizes the signal and generates a ticket symbol while reserving space in the target buffer 46 for the packet to be sent. The ticket symbol is ultimately placed on the ring interconnect 20 by the downstream router 43 of the target node and sent back to the source node. At the source node, the ticket symbol is transferred by the upstream router to the source handler 52. The source handler 52 compares the target and the stream number with the values contained in the outstanding vouchers and gives permission to launch the packet whose values match the incoming ticket. The packet is ultimately placed on the ring interconnect 20 by the downstream router 43 and travels to the target node where it is placed in the target buffer 46. From the target buffer 46, the packet is routed to the associated computer component.

It will be recognized by those skilled in the art that the arrangement of the co-pending patent application provides concurrent transfer of information between a number of system components while assuring that the voucher and ticket signals upon which the transfer of the data signals depend are forwarded on a priority basis to efficiently accomplish their purposes. However, this circuit does not forward information signals or provide for the receipt of information signals based on the urgency of the information being sent.

The arrangement of the present invention provides for forwarding information on a basis determined by the urgency of the information being transferred. The arrangement does this by improving at least three portions of the individual nodes 21 so that more urgent information is handled first. The circuits which are modified are the source buffers 39 and multiplexor 41, the ring buffer 49, and the target handler 50. Other than as described hereinafter, all of the elements of the arrangement 20 illustrated in FIG. 1 are included in the arrangement of the invention and all of the elements so included function in the manner above described. As in the previous description, each symbol used with the ring interconnect 20 includes the identifier of its source node, the identifier of its target node, the stream with which it is associated, and an indication of the type of signal. However, in the arrangement of the present invention, each symbol also includes an indication of the urgency of the signal. Thus, a voucher symbol indicates its source, its target, its stream, that it is a voucher, and that the information to be sent has a particular urgency level.

Figure 2:
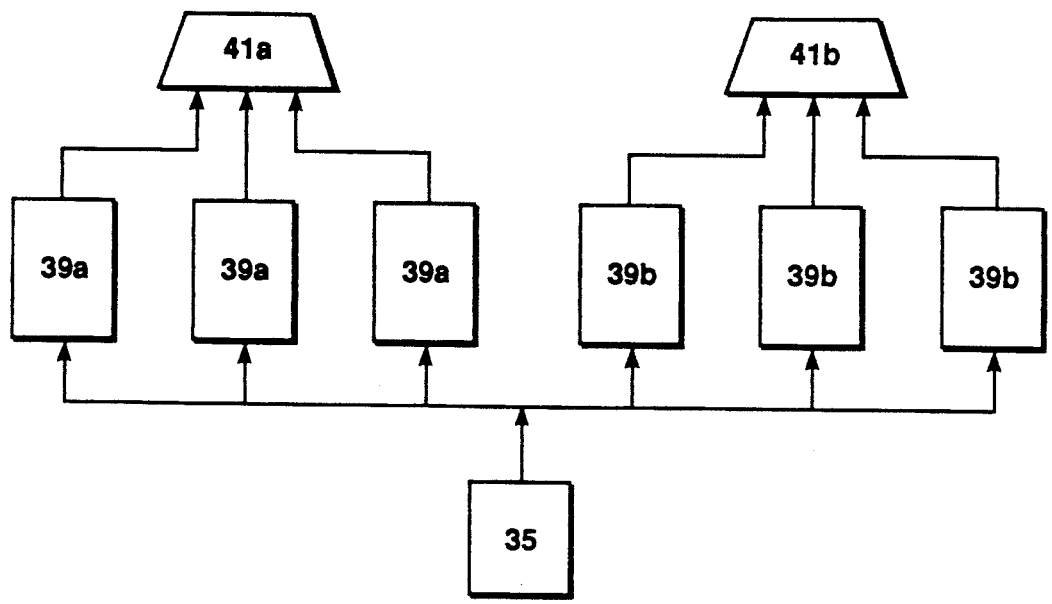
FIG. 2 is a block diagram of an improved portion of the interconnect illustrated in FIG. 1.

FIG. 2 illustrates a series of source buffers 39a and 39b which are substituted for the source buffers 39 illustrated in FIG. 1. The number of source buffers 39a and 39b which are included will depend upon the particular implementation of the node 21 of such an arrangement. However, it will be presumed for the purpose of this description that the computer system component associated with the particular node 21 is capable of producing packets of information for transfer on the ring interconnect 20 which are of two urgency levels. Furthermore, in the description which follows, it will be assumed that five different urgency levels designated one through five exist for the entire system with the one level being the lowest urgency level and the five level being the highest urgency level. For the purpose of this description, the information urgency levels at which the component at the particular node 21 is capable of sending are assumed to be urgency levels two and four. With two levels of urgency, three source buffers 39a and three source buffers 39b provided in the arrangement of FIG. 1 for exemplary purposes.

In FIG. 2, the sources buffers 39a are arranged to receive information having an urgency level of two, and the sources buffers 39b are arranged to receive information having an urgency level of four. Consequently, the information is directed to the source buffers 39a and 39b by the transmit router 37 based on the level of urgency indicated with the symbols originated by the associated component. As in the previous arrangement, the transmit router 37 receives the symbol stream from the transmit port 35, determines which of the source buffers 39a or 39b is entitled to receive the stream (using the urgency level in addition to other information), and forwards the stream to the selected source buffer 39a or 39b. The transmit router 37 sorts the incoming symbols by stream number and collects those symbols together so that all symbols pertaining to one stream are placed in one source buffer 39a or 39b. As soon as a source buffer 39a or 39b has a head symbol and one data symbol, it sends signals indicating the target node, the urgency level, and the stream to a source handler 52. The source handler 52 responds by forming a voucher using this information and sending the voucher symbol to the downstream router 43. It should be noted that in the arrangement of this invention, the voucher signals from a source node carry urgency levels so that a distinction can be made as to which information should be transmitted first.

Figure 3:
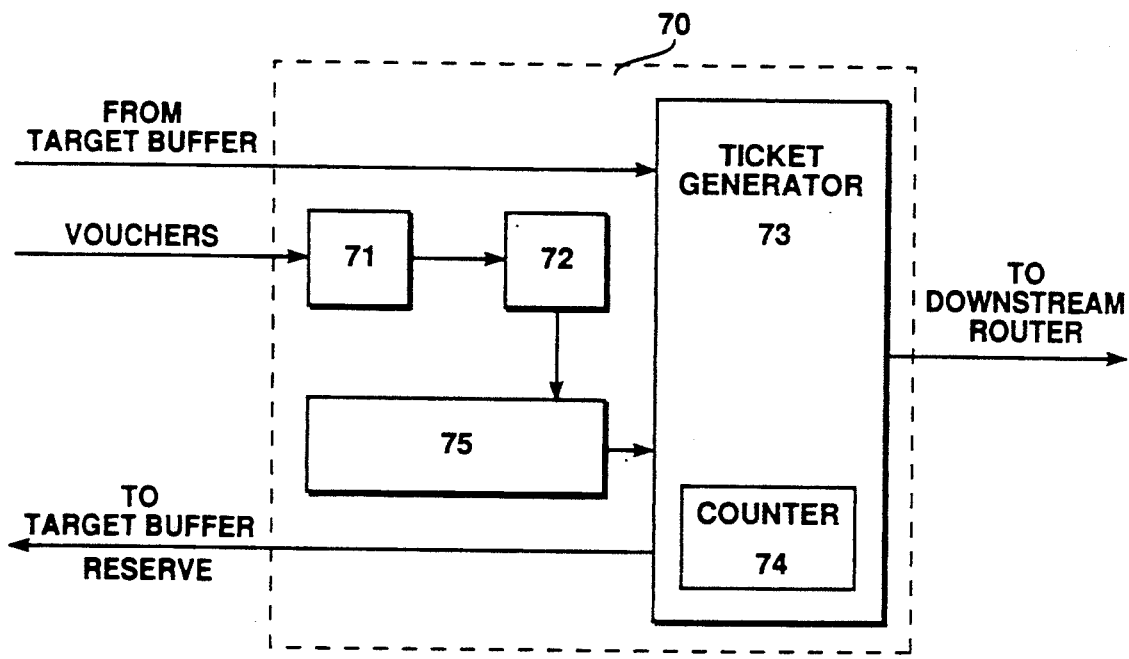
FIG. 3 is a block diagram of another improved portion of the interconnect illustrated in FIG. 1.

When a voucher symbol is received by a target node 21, it is transferred to the target handler 50. In order to provide for allotting space at a target node 21 based on the urgency of the information to be sent, the target handler 50 is improved over that described in FIG. 1. FIG. 3 illustrates a target handler 70 which is substituted for the target handler 50 of FIG. 1.

The target handler 70 receives the voucher access symbols directed to that node 21. The target handler 70 monitors the state of the target buffer 46 and, assuming space is available, reserves space and issues tickets to guarantee that the target buffer 46 will receive the information. These ticket symbols may also include information indicating the urgency level of the information to be transmitted. However, if the number of vouchers requesting space in target buffer 46 exceeds the space available, the additional vouchers are stored in a target voucher queue 71 in the target handler 70. The target handler 70 determines whether space is available by including a counter 74 that is initialized to the maximum number of packets that can be stored in the target buffer 46 at once. Each time the target handler 70 issues a ticket, the counter is decremented. Each time the target buffer 46 sends a tail-received signal to the target handler 70, the counter is incremented. If the counter goes to zero, there is no more space in the buffer 46 and the voucher is placed in the voucher queue 71 and no ticket is issued. If the voucher queue 71 is not empty, each time a tail-received signal arrives, a voucher is removed form the queue 71 and a ticket is generated by the ticket generator 73. If a voucher arrives when the queue 71 is empty and the counter value is greater than zero, then a ticket is derived from the voucher and sent immediately to the downstream router 43.

However, in contrast to the target handler 50 of FIG. 1, the target handler 70 organizes the vouchers directed to the voucher queue of this node 21, not on a first-in first-out basis, but in order of the urgency of the information to be sent. This is accomplished by routing each incoming voucher symbol to the voucher queue 71 and then through a sorter circuit 72 before sending any voucher to the ticket generator 73. The sorter circuit 72 sorts the vouchers in the unsorted queue 71 into an order based both on their urgency and their arrival time so that the voucher of highest urgency which was first received stands at the head of the sorted voucher queue 75. In this manner, when the space in the target buffer 46 is full, the additional space allotted as the buffer 46 empties is allotted on an urgency basis to the most urgent information, the voucher for which is ready in the sorted voucher queue 75.

Figure 4:
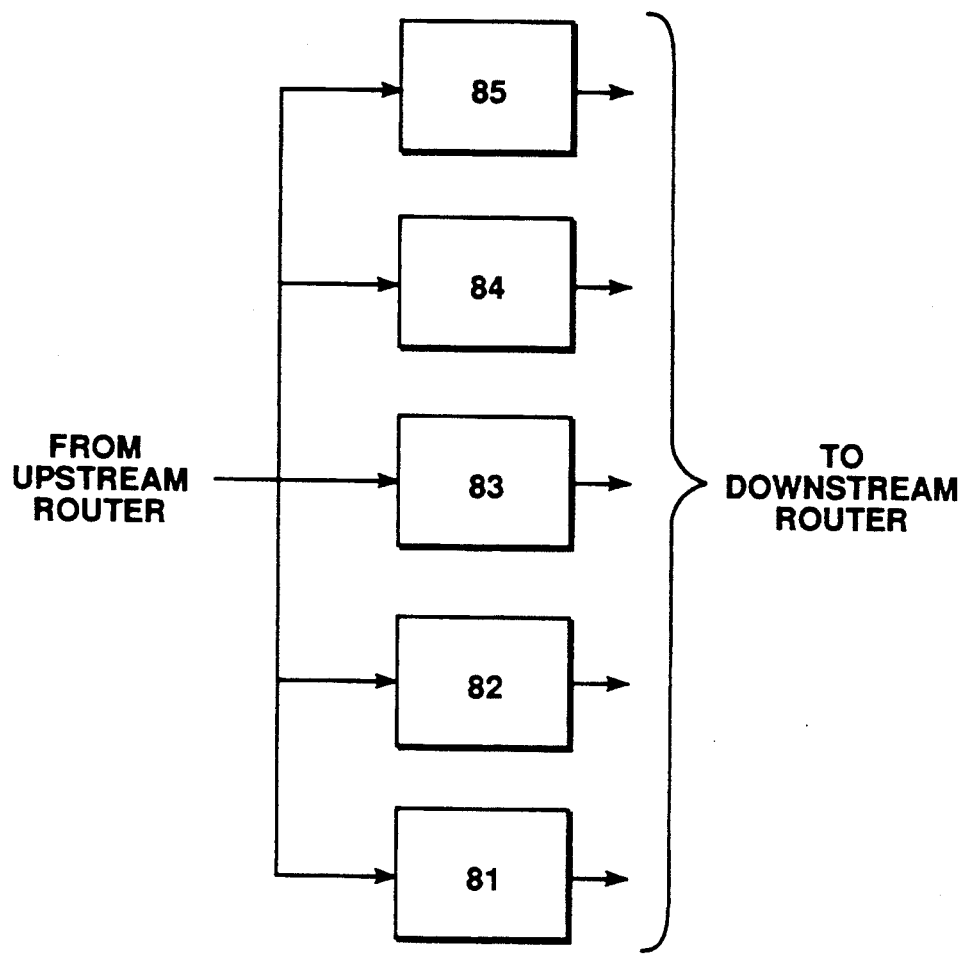
FIG. 4 is a block diagram of a third improved portion of the interconnect illustrated in FIG. 1.

In order to provide for the transmission of information through the nodes of the interconnect 20 on an urgency basis, the ring buffer 49 illustrated in FIG. 1 is also modified. FIG. 4 illustrates a ring buffer block 80 which may be substituted for the ring buffer 49 of FIG. 1. Rather than a simple ring buffer which handles all information to be transferred through the node 21 to other nodes, the ring buffer block 80 includes five individual ring buffers 81-85 each of which handles one or more urgency levels of information. For the purpose of explanation, the ring buffer 81 will be considered to handle information of level one urgency, the ring buffer 82 to handle information of level two urgency, the ring buffer 83 to handle information of level three urgency, the ring buffer 84 to handle information of level four urgency, and the ring buffer 85 to handle information of level five urgency. Thus the buffer 82 handles information at the same urgency as that stored in the source buffer 39a, and the buffer 84 handles information at the same urgency as that stored in the source buffers 39b.

The ring buffers 81-85 are each the temporary repository of packet symbols at a particular urgency level that are to be forwarded to other nodes. Each individual buffer may be organized as a first-in first-out circuit whose capacity is sufficient to absorb whatever upstream traffic may be expected to arrive at that urgency level while the downstream router 43 is selecting and transmitting symbols from other sources. The number of individual ring buffers needed in the ring buffer block 80 depends on the number of urgency levels which are to be originated at the particular node 21. For each urgency level originated at that node, there must be a ring buffer to handle traffic of an equal urgency level, one to handle traffic of higher urgency levels, and one to handle traffic of lower urgency levels. Were the node being described a source of information at only one urgency level, only three ring buffers would be necessary although at least one of those buffers would handle information from multiple levels of urgency. Since information at the two urgency levels four and two may be originated by the node, five ring buffers are required.

As with the arrangement of FIG. 1, information is directed to the ring buffers 81-85 by the upstream router 45 if the symbols involved show the information is addressed to other than this node 21 and based on the particular urgency level associated with the symbols.

In general, the priority of the transfer of information remains as in the arrangement of FIG. 1. As in the circuit of FIG. 1, the downstream router 43 chooses between many possible sources of information by selecting them according to a defined priority which is adapted to deal with the urgency of the information involved in order to assure the forward progress of the most important information. The downstream router 43 controls the transfer of information onto the ring interconnect 20 through the downstream port 33. The highest priority signals are the access symbols (vouchers and tickets) sent through the cut-through buffer 48, and they are usually propagated through the downstream port 33. In general, the access symbols not addressed to this node 21 pass through the cut-through buffer 48 thereby assuring maximum propagation speed for such symbols around the ring interconnect. The next highest priority source of symbols is the target handler 70 which returns ticket access symbols from this node 21 in response to received voucher access symbols. The next priority level is used by the source handler 52 which sends the voucher access symbols generated at this node to the downstream router 43. All of these are sources of access symbols which must propagate around the ring interconnect with greater priority than any packet symbols.

If there are no access symbols awaiting transmission, then the downstream router 43 looks to the packet symbols which may be held in the ring buffer block 80 or in a pair of packet multiplexors 41a and 41b. The packet multiplexor 41a determines which source buffer 39a should be emptied first and forwards the chosen stream of information to the downstream router 43. A second packet multiplexor 41b determines which source buffer 39b should be emptied next and forwards the chosen stream of information to a downstream router 43. Each of the packet multiplexors 41a and 41b selects among the source buffers 39a or 39b which it controls that have permission to transmit a packet and selects one on a basis assuring fairness. Once selected, the packet multiplexor 41a or 41b transmits the information until terminated by the source buffer 39a or 39b or interrupted by a higher priority signal.

In order to assure that the information is routed through and from the node 21 on the appropriate urgency basis, the downstream router 43 proceeds through each of the urgency levels of the ring buffer block 80 and the packet multiplexors 41a and 41b in turn from the highest to the lowest. If none of the ring buffers 81-85 or the packet multiplexors 41a and 41b are in the process of transmitting a packet, then the head symbol of the information in the highest level ring buffer 81-85 or source buffer 39a or 39b is selected for transmission to the downstream port 33. If a packet is being sent by one or the other of the packet sources, no information can be sent by a lower or equivalent urgency level source until that packet has been sent. If two equivalent urgency level packets appear at the same time (as at the ring buffer 84 and the packet multiplexor 41b), then one or the other of the signals may be selected on a round robin or other basis to ensure fairness.

Figure 5:
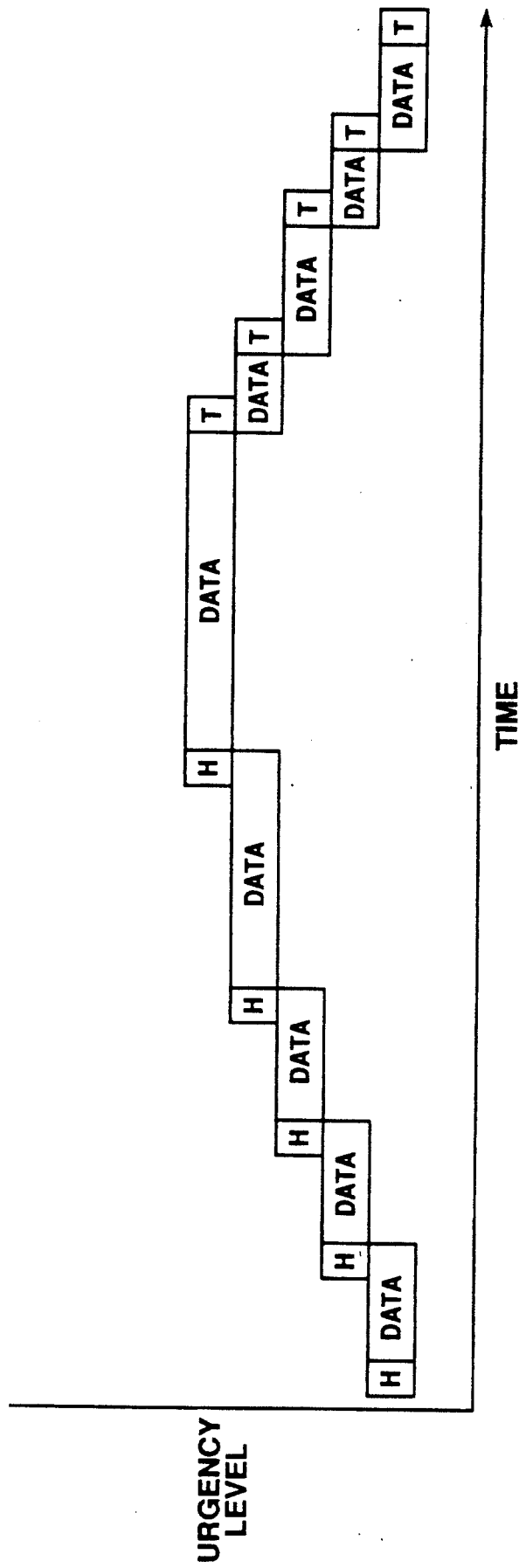
FIG. 5 illustrates the timing for transferring information packets of five different urgency levels.

If information in any of the ring buffers 81-85 or the source buffers 39a or 39b is being transmitted and information is received at the cut-through buffer 48, one of the ring buffers 81-85 or the source buffers 39a or 39b which is at a higher urgency level, a level detector circuit 87 in the downstream router 43 detects this fact, terminates the transmission of the symbols being sent at that point, and begins transmitting access symbols or the higher level information. This has the effect of nesting voucher symbols, ticket symbols, and higher urgency level information packet within a lower level packet. This higher level signal may in turn be interrupted by another even higher level information signal during its transmission. Theoretically, with five urgency levels, four information packets might be nested in a lowest level information packet. FIG. 5 illustrates packets of information from four different levels nested within a lower level packet. As the highest level packet is completed as indicated by the transmission of its tail symbol, the downstream router scans to the next source of signals at the same urgency level (if any), then to a source at the next lower level. If a source at a particular urgency level has been previously transmitting a packet of information and that information was interrupted, this is indicated by the information first in line in the particular buffer being a data or tail symbol rather than a head symbol, and this source is handled first at that level to complete the transmission of the packet of information. Then any other packet at that level is handled. Ultimately, all of the nested packets of information are transmitted by the downstream router 43.

It will be noted by those skilled in the art that the nesting of packets of information requires that the upstream router 32 of each node be equipped to handle packets of information which are incomplete. For example, if a packet is being transmitted to the node 21 as a target node and that transmission is interrupted, the upstream router 32 of the node must intercept the head signal and transmit the information to the appropriate position within the node 21. The upstream router must then look to the next symbol following the next tail symbol to determine whether that is data which is to complete the packet which was earlier being transmitted.

Thus it will be appreciated that the invention described herein is capable of transferring information both through each node and originated at the node based on the urgency of the information being transmitted. This ability substantially enhances the ability of the system to transmit very large amounts of information and especially the usefulness of the system in arrangements which transfer information such as video and sound information.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An improved computer system interconnection for use within a computer system, the computer system including a plurality of components, the interconnection comprising a plurality of nodes, each node being associated with one of the plurality of components, each node being coupled to an upstream node via a first transmission means, the first transmission means receiving information from other nodes, each node being coupled to a downstream node via a second transmission means, the second transmission means transmitting information to the other nodes, the information including:

a multiplicity of symbol streams, each symbol stream including a multiplicity of symbols of data, each symbol having a type, symbol types including data symbols and access symbols, access symbols including voucher symbols and ticket symbols, each voucher symbol representing a request for reservation of data space in a target node, each symbol including a target bit indicative of a target node, a source bit indicative of source node and urgency bits indicative of a level of urgency of the symbol data, each node comprising:

1) source buffering means for receiving information from the node's associated component, the source buffering means organizing information from the node according to streams and urgency bits, streams coming from the node having a first source level urgency or a second source level urgency, the first source level urgency and the second source level urgency each being one of the levels of urgency, the first source level of urgency being a greater level of urgency than the second level of source urgency, symbols from the source buffering means having a third priority;

2) relay buffering means for relaying symbols received from the first transmission means whose target bits indicate that they are targeted at other nodes, the relay buffering means including one buffering means for each level of urgency, symbols from the relay buffering means having the third priority;

3) voucher generation means for generating voucher symbols when the node's associated component inputs information targeted at other nodes, symbols from the voucher generation means having a second priority;
4) a first routing means responsive to voucher symbols received via the first transmission means targeted at the node, the routing means determining whether the node's associated component is able to receive information;
5) target handling means responsive to the determination that the node's associated component is able to receive information, the target handling means responding by generating a ticket symbol indicating reservation of data space, symbols from the target handling means having a first priority;
6) source handling means responsive to receipt of ticket symbols indicating that a target node is prepared to receive information from the node, the source handling means responding by enabling the source buffering means to release information to be transmitted to the target node associated with the ticket received; and
7) a downstream routing means for coupling to the second transmission means symbols from the source buffering means, relay buffering means, voucher generation means and target handling means according to symbol priority and urgency level, the downstream routing means coupling symbols with lowest priority to the second transmission means before symbols with higher priority and when symbols have equal priority levels the downstream routing means coupling symbols with higher urgency levels before symbols with lower urgency levels.

2. The improved computer system interconnection of claim 1 wherein the source buffering means includes at least one buffering storage means for each level of urgency.

3. The improved computer system interconnection of claim 1 wherein the relay buffering means includes:
a) a first first-in first out (FIFO) for storing symbols having a greater level of urgency than the first source level or urgency; and
b) a second FIFO for storing symbols having a lower level of urgency than the second source level of urgency.

4. The improved computer system interconnection of claim 1 further comprising:
8) a target buffering means coupled to first transmission means and the node for storing data symbols to targeted at the node based upon urgency level.

5. The improved computer system interconnection of claim 4 further comprising:
9) voucher storing means coupled to the first transmission means for storing vouchers targeted at the node when the target buffering means is unable to store additional symbols, the voucher storing means storing vouchers according to urgency level.

6. The improved computer system interconnection of claim 5 wherein the voucher storing means includes:
a) a first-in first-out (FIFO) for storing vouchers targeted at the node; and
b) a voucher sorting means for sorting vouchers according to urgency level and placing the vouchers in the FIFO.

7. The improved computer system interconnection of claim 1 wherein the downstream routing means includes means for interrupting the coupling to the second transmission means of symbols having a lower level of urgency and transmitting symbols having a greater level of urgency.

8. The improved computer system interconnection of claim 7 further comprising:
a target buffering means coupled to the first transmission means and the node for storing data symbols to targeted at the node based upon urgency level.

9. The improved computer system interconnection of claim 3 wherein the forwarding buffering means further includes:
c) a third FIFO for storing symbols having a level of urgency less than the first level of source urgency and greater than the second level of source urgency.

* * * * *